(12) United States Patent
Miller et al.

(10) Patent No.: US 11,008,101 B2
(45) Date of Patent: May 18, 2021

(54) SYSTEMS, METHODS, AND DEVICES FOR PACKAGE DELIVERY USING UNMANNED AERIAL VEHICLES

(71) Applicant: Ford Global Technologies, LLC, Dearborn, MI (US)

(72) Inventors: Kenneth Miller, Pinckney, MI (US); Thomas Leone, Ypsilanti, MI (US); Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 277 days.

(21) Appl. No.: 16/172,665

(22) Filed: Oct. 26, 2018

(65) Prior Publication Data

US 2020/0130833 A1   Apr. 30, 2020

(51) Int. Cl.
  *B64D 1/22* (2006.01)
  *B64C 39/02* (2006.01)
  *B66D 1/60* (2006.01)
  *B66D 1/54* (2006.01)

(52) U.S. Cl.
  CPC .............. *B64D 1/22* (2013.01); *B64C 39/024* (2013.01); *B66D 1/54* (2013.01); *B66D 1/60* (2013.01); *B64C 2201/022* (2013.01); *B64C 2201/082* (2013.01); *B64C 2201/128* (2013.01)

(58) Field of Classification Search
  CPC ........ B64C 2201/182; B64C 2201/128; B64C 2201/022; B64C 2201/082; B64F 1/04; B64F 1/02; B64F 1/0299; B64F 1/0295; B64F 1/029; B64F 1/08; B64D 1/22
  See application file for complete search history.

(56) References Cited

U.S. PATENT DOCUMENTS

| | | | | |
|---|---|---|---|---|
| 4,311,290 A | * | 1/1982 | Koper | B64F 1/02 244/110 R |
| 4,753,400 A | * | 6/1988 | Reuter | B64F 1/02 244/110 R |
| 6,874,729 B1 | * | 4/2005 | McDonnell | B64C 25/68 244/63 |
| 7,264,204 B1 | * | 9/2007 | Portmann | B63B 35/50 |
| 10,556,709 B1 | * | 2/2020 | Kimchi | B64D 27/16 |

(Continued)

FOREIGN PATENT DOCUMENTS

KR    101808845 B1    12/2017

OTHER PUBLICATIONS

Eriksson, et al. (2013). Launch and recovery systems for unmanned vehicles onboard ships. A study and initial concepts. Naval Architecture Master's Thesis (96 pages).

*Primary Examiner* — Philip J Bonzell
*Assistant Examiner* — Tye William Abell
(74) *Attorney, Agent, or Firm* — Brandon Hicks; Eversheds Sutherland (US) LLP

(57) ABSTRACT

Systems and methods are disclosed for package delivery using unmanned aerial vehicles. Example methods may include positioning a first component at a first elevation, and operatively connecting the first component to a winch; positioning a second component at a second elevation higher than the first elevation; and configuring cable of a lifting component to: operatively connect to the first component and the second component, connect to and disconnect from a vehicle, and lift the vehicle from the first component towards the second component using the winch.

20 Claims, 7 Drawing Sheets

(56) References Cited

U.S. PATENT DOCUMENTS

| | | | | |
|---|---|---|---|---|
| 2002/0100838 A1* | 8/2002 | McGeer | ............... | B64F 1/0295 |
| | | | | 244/116 |
| 2005/0017129 A1* | 1/2005 | McDonnell | ............ | B64C 25/68 |
| | | | | 244/110 G |
| 2015/0166177 A1* | 6/2015 | Bernhardt | ............... | B64D 1/22 |
| | | | | 258/1.2 |
| 2015/0360797 A1* | 12/2015 | Melish | ..................... | B64F 1/02 |
| 2016/0375981 A1* | 12/2016 | McDonnell | ............ | B64F 1/222 |
| | | | | 244/13 |
| 2017/0320592 A1* | 11/2017 | Chen | ........................ | B64F 1/02 |
| 2019/0071176 A1* | 3/2019 | von Flotow | ............. | B64F 1/36 |
| 2019/0337638 A1* | 11/2019 | Dennis | ................... | B64F 1/029 |

\* cited by examiner

SYSTEMS, METHODS, AND DEVICES FOR PACKAGE DELIVERY USING UNMANNED AERIAL VEHICLES

TECHNICAL FIELD

The disclosure relates generally to unmanned aerial vehicles (UAVs) or drones and more particularly relates to systems, methods, and devices for package delivery using UAVs.

BACKGROUND

An increasing number of packages are delivered to business, residential, and other locations daily. Package delivery of small quantities of items is often completed using a delivery truck, van, or other vehicle that is driven by a human driver. The human may drive the vehicle between delivery locations and walk with a package up to or into a building, mailbox, or other location to deliver the package. In some embodiments, unmanned aerial vehicles (UAVs) (also referred to as drones herein) may be used in a growing body of applications, including faster and cheaper package delivery.

DETAILED DESCRIPTION

Figure 1:
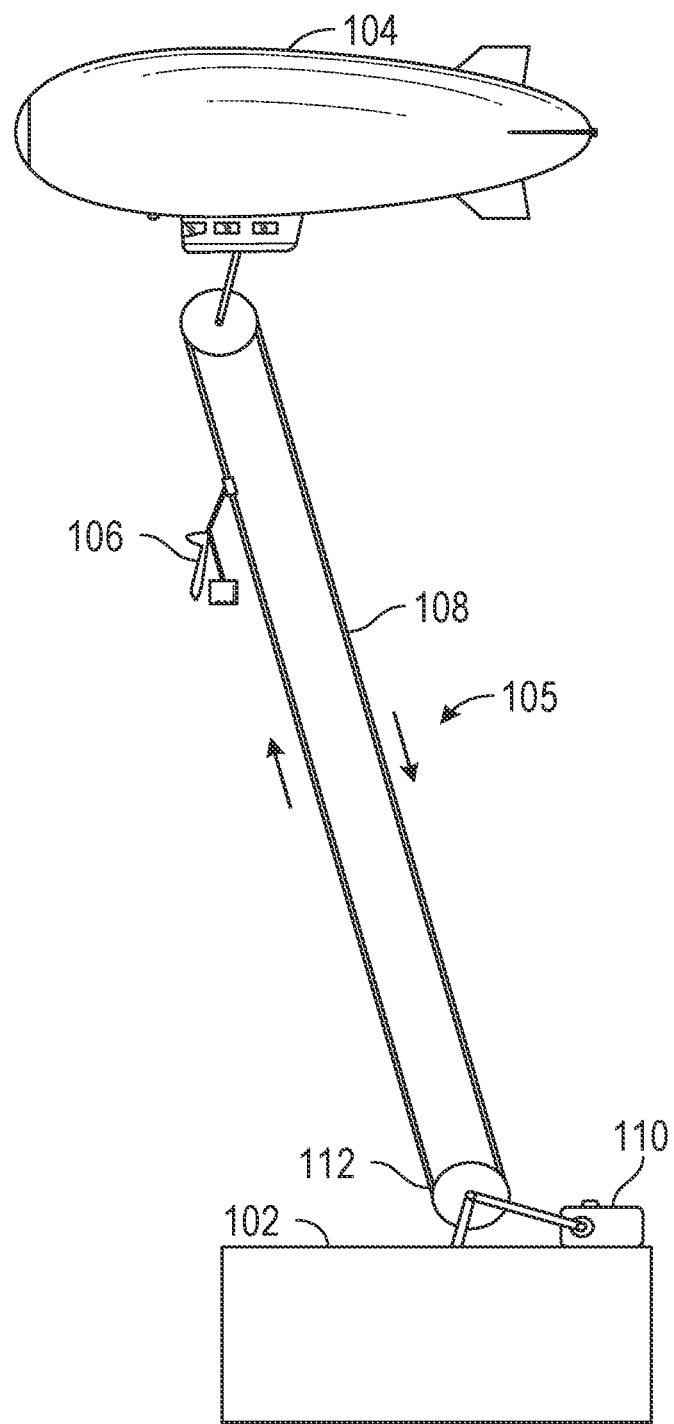
FIG. 1 illustrates a set of components for a package delivery system using UAVs, according to various embodiments of the disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In some embodiments, unmanned aerial vehicles (UAVs) (also referred to as drones herein) may be used in a growing body of applications, including faster and cheaper package delivery. In some embodiments, drone weight carrying capability may be limited by the additional power and fuel required to take off and ascend to the given altitude for travel. In various embodiments, systems, methods, and apparatuses are described that serve to facilitate the transport of packages using UAVs. In one aspect, embodiments of the disclosure relate to package delivery that include vertically transporting one or more packages and drones to an aerial component (e.g., a balloon or blimp) that is attached to a ground component (e.g., a ground distribution center) by a winch system. In one aspect, the drone can couple (e.g., mechanically attach) to package, and the assembly can then couple to the winch (e.g., mechanically attach using a drone component such as an arm and hand to grab a cable of the winch system). The winch can thereby transport the drone and package to the aerial component, where the drone may transport the package to a destination without using the drone's on-board energy supply (e.g., electrical energy) to reach a given elevation needed for transporting the package to the destination.

In one aspect, the winch may include a motor, and the motor may be located at the ground and/or the aerial component. In one aspect, the motor may rotate the winch to elevate the package and the UAV to a given elevation. In one aspect, the elevation of the package and the UAV may be less than the elevation of the aerial component; further, the elevation may be determined at least in part on the range needed for the UAV to deliver the package. Further, the elevation may be determined by a power capacity of the UAV, a weight of the package, a weather condition, an air density, and the like. Moreover, the elevation may be determined by a second, additional elevation determined for any additional efficiency desired by the drone operator. For example, the additional elevation may serve to enable the UAV to glide more if released from the winch line at a higher elevation. In one aspect, the motor of the winch system may operate continuously, and the UAV may simultaneously determine the UAV's elevation using one or more UAV sensors (e.g., altitude sensors, one or more global positioning system (GPS) signals, and the like). In another aspect, when the UAV determines that the UAV has reached a pre-determined elevation, a component of the UAV (e.g., the UAV's arm and hand) may release from a cable associated with the winch system and then transport the package to its destination.

As noted, in some aspects, embodiments of the disclosure may include an aerial component. In one aspect, the aerial component may include a passive aerial element (e.g., a balloon such as a weather balloon), or an active aerial element (e.g., a blimp having a motor to maintain a relatively fixed position for a given duration of time, for example, by resisting wind currents).

In another aspect, the efficiency of the winch system may be increased by other returning drones with packages that attach to the down side of the winch system (e.g., in a similar fashion to counterbalancing an elevator; see, for example, FIG. 1-3 below and related description).

In one aspect, the ground component may be mobile or may be stationary. For example, the ground component may include a vehicle such as a truck or at least a portion of a building. In another aspect, the vehicle may park at a given location, raises the aerial component, and may be configured to operate a winch to elevate the packages and UAVs.

In another aspect, there may be aerial components connected to two or more ground components (e.g., two or more ground distribution centers). In another aspect, a first aerial component may be associated with package delivery, and a second aerial component may be associated with package reception. In one aspect, a package at a first distribution center may be elevated up toward a first aerial component (e.g., a first balloon A) using a first winch line and a winch system; then, a UAV may transport the package to a second winch line attached to a second aerial component (e.g., a second balloon B). In another aspect, the package may be lowered via the second winch line to a second distribution center. This way the drone may remain at a higher altitude during transport, which has less air drag because of the lower air density at higher elevation. Further, embodiments of the disclosure may enable a more energy efficient systems, methods, and apparatuses to raise packages and drones up to the predetermined altitude, thereby providing energy savings.

In some aspects, the mobile ground components may be arranged strategically to cover a given geographical area for a given period of time. For example, during periods of high demand for packages (e.g., during holiday seasons, during disaster relief operations, etc.), several mobile ground components may be arranged in a given pattern in a city or county to most efficiently distribute the packages to different sites for a period of time, such as for a day, a week, or longer.

FIG. 1 shows a diagram of an example UAV and package delivery system, in accordance with example embodiments of the disclosure. In one aspect, the UAV and package delivery system 100 includes a ground component 102. In another aspect, the ground component 102 may include a charging unit (e.g., a battery) for charging the UAV. The charging unit may be configured to wirelessly charge the UAV.

In another aspect, the ground component 102 can include a ground-based distribution center. In another aspect, the distribution center may include a warehouse or other specialized building, often with refrigeration or air conditioning, which may be stocked with products (goods) to be redistributed to other distribution centers, retailers, wholesalers, or directly to consumers. In one aspect, a distribution center can also be referred to as a warehouse, a fulfillment center, a cross-dock facility, a bulk break center, and/or a package handling center. In one aspect, the name of the distribution center may be based on the purpose of the operation. For example, a retail distribution center may distribute goods to retail stores, an order fulfillment center may distribute goods directly to consumers, and a cross-dock facility may store distributes goods to other destination. In one aspect, the distribution center may range in size from less than approximately 50,000 square feet (5,000 square meters) to the approximately 3 million square feet (300,000 square meters).

In another aspect, the distribution center may include three main areas and additional specialized areas. In one aspect, the three main areas may include a receiving area or dock, a storage area, and a shipping area or dock. In smaller ground components, it may be possible for the receiving and shipping functions to occur side by side. In another aspect, the receiving dock can also be specialized based on the handling characteristics of freight being received, on whether the product is going into storage or directly to a store, or by a type of vehicle delivering the product.

In another aspect, the ground component 102 may include a mobile component (e.g., a vehicle such as a truck). In particular, the type of vehicle may include a specialized vehicle to deliver a particular type of product. For example, the mobile ground component may include semi-trailers that are outfitted with various trailers such as box trailers, flatbeds, car carriers, tanks and other specialized trailers. The mobile ground component may further include armored cars, dump trucks and concrete mixers. In one aspect, the mobile ground component may include passenger vehicles that may be used for delivery of goods. Non-limiting examples include buses, vans, pick-ups, and cars (e.g., for mail or pizza delivery). In one aspect, the mobile component may include a fixture (not shown) such that other components of the winch system 105 (to be discussed below), such as a motor or a spool may be affixed.

In another aspect, the UAV and package delivery system 100 may include a winch system 105. In one aspect, a winch system (alternatively simply referred to as a winch herein) may refer to a mechanical device that may be used to pull in (wind up) or let out (wind out) or otherwise adjust the tension of a rope 108 or wire rope (also called cable or wire herein). The winch may include a spool 112 and attached hand crank (not shown) or motor 110. In another aspect, the winch system 105 have gear assemblies (not shown) and can be powered by motors 110 that may include electric, hydraulic, pneumatic or internal combustion drives. In another aspect, the winch system 105 may include a solenoid brake and/or a mechanical brake or ratchet and pawl device (e.g., a pivoted curved bar or lever whose free end engages with the teeth of a cogwheel or ratchet so that the wheel or ratchet can only turn or move one way) that prevents it from unwinding unless the pawl is retracted. In one aspect, the rope 108 may include a 1,000 to 1,600-metre (3,000 to 5,500 ft) cable, made of high-tensile steel wire or a synthetic fibre.

In one aspect, the rope 108 may be stored on a portion of the winch system 105 (e.g., prior to assembly). In one aspect, for setting up the winch system 105 to an aerial component 104 and a ground component 102, a user may turn a winch handle (not shown) with one hand, while tailing (pulling on the loose tail end) with the other to maintain tension on the rope. A user may be an individual, a family, a company, an organization, an entity, a department within an organization, a representative of an organization and/or person, and/or the like. In one example, users may be employees, residents, customers, and/or the like.

In another aspect, the winch system 105 may include a snubbing winch (not shown). In another aspect, the snubbing winch may include a vertical spool (similar, but not identical to spool 112) with a ratchet mechanism similar to a conventional winch, but with no crank handle or other form of drive. In one aspect, the line may be wrapped around the spool and can be tightened and reeled in by pulling the tail line, the winch takes the load once the pull is stopped with little operator tension needed to hold it. The snubbing winch may also allow controlled release of the tension by the operator using the friction of the line around the ratcheted spool. In one aspect, the snubbing winch may be used to supplement and relieve tension on the primary winch mechanisms.

In another aspect, the winch system 105 may include an air winch (also referred to as an air hoist or air tugger). In one aspect, the air winch may include an air-powered version of a winch. In another aspect, the air winch may be used over an electric, diesel, and hydraulic winches in application requiring enhanced durability, versatility, and/or safety.

In another aspect, the UAV and package delivery system 100 may include an aerial component 104. The aerial component 104 may include a blimp. In another aspect, a blimp, or non-rigid airship, may refer to an airship or barrage balloon without an internal structural framework or a keel. Unlike semi-rigid and rigid airships (e.g. Zeppelins), blimps may rely on the pressure of the lifting gas (usually helium, rather than hydrogen) inside the envelope and the strength of the envelope itself to maintain their shape.

In another aspect, the aerial component 104 may include a gas balloon. In one aspect, the gas balloon may include a balloon that flies in the air because it is filled with a gas less dense than air or lighter than air (such as helium or hydrogen). The gas balloon may be tied to a thread (and coupled to the ground component 102) to prevent it from flying up in the air. The gas balloon may also be sealed at the bottom to ensure that the gas does not escape.

In one aspect, the aerial component 104 may include a thermal airship. In one aspect, the thermal airship may include an airship that generates buoyancy by heating air in a large chamber or envelope. The lower density of interior hot air compared to cool ambient air causes an upward force on the envelope. The thermal airship may be similar to a hot air balloon; however, the thermal airship may have a powered means of propulsion, whilst a hot air balloon relies on winds for navigation.

In one aspect, the UAV and package delivery system 100 may include a UAV and/or a package 106. As used herein the terms drone or unmanned aerial vehicles (UAV) may refer to vehicles that are capable of flight and/or navigation with little or no real-time human input. For example, embodiments of drones or aerial vehicles may deliver packages from a ground component 102 to a delivery location with little or no input from a local or remote human operator. However, it will be appreciated that embodiments of drones or aerial vehicles disclosed herein may also deliver packages from a ground vehicle to a delivery location with some input from a local or remote human operator.

Figure 2:
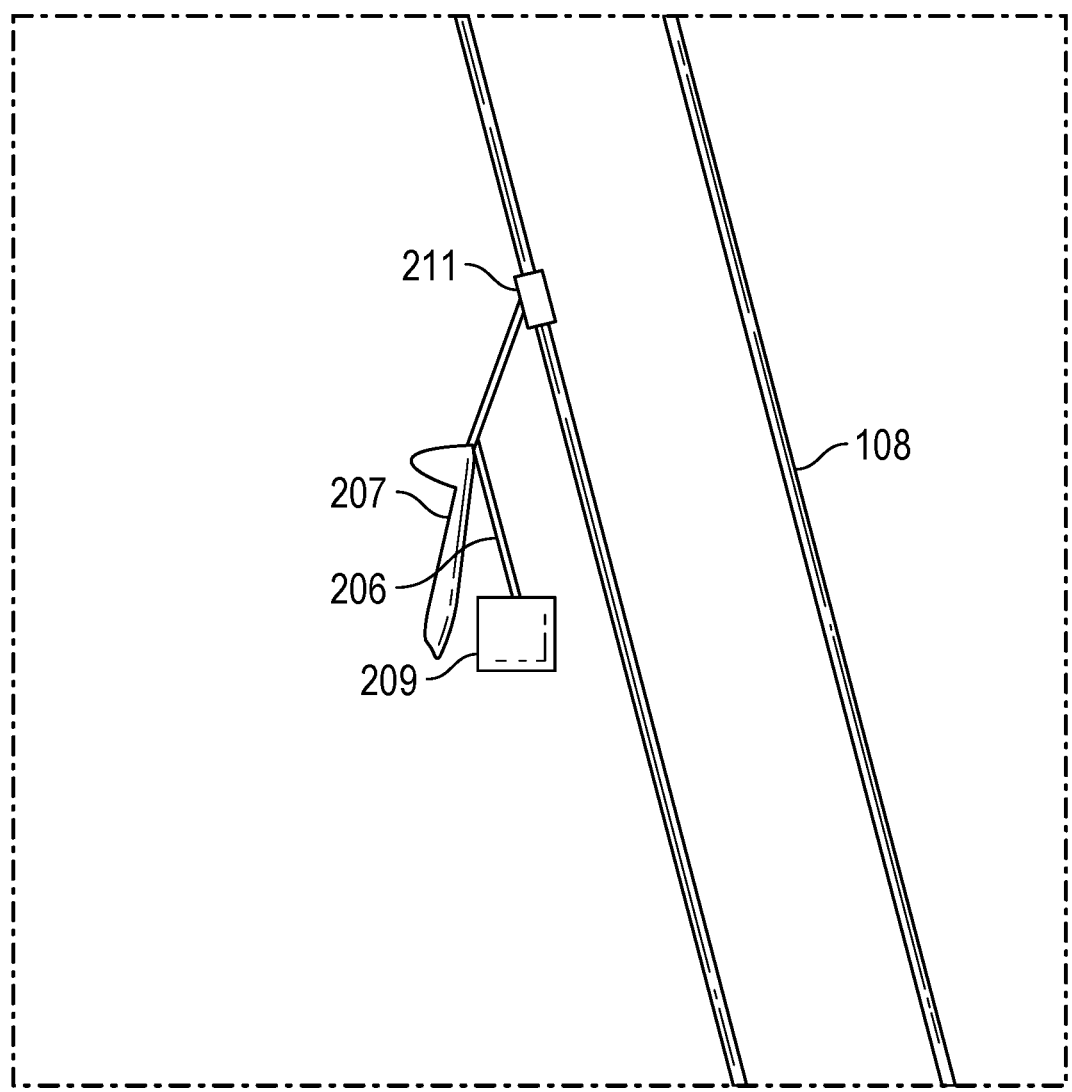
FIG. 2 shows a diagram illustrating a set of components for a package delivery system using UAVs, according to various embodiments of the disclosure.

FIG. 2 shows a diagram illustrating set of components for a package delivery system using UAVs, according to various embodiments of the disclosure. In one aspect, the UAV and package delivery system 200 may include drone 207. In one aspect, the UAV 207 may include a component 211 (e.g., a hand, arm, or the like) for operatively connecting the drone 207 to the cable 108. The component 211 mechanically may attach to the drone 207 while also mechanically attaching to the cable 108, thereby allowing the cable 108 to transport the drone 207 in multiple directions (e.g., upwards or downwards) based on whether the component 211 is attached to a portion of the cable 108 that is moving upward (e.g., as shown on the leftward portion of the cable 108 in FIG. 1) or is attached to a portion of the cable 108 that is moving downward (e.g., as shown on the rightward portion of the cable 108 in FIG. 1).

In another aspect, the UAV 207 may include a fastening mechanism 206, such as a hook and loop attachment mechanism. In one aspect, a package 209 may be placed in a container (not shown) having a loop structure (not shown) on the container, or the package 209 may be wrapped in cable (not shown) on all four sides where the cable may have a loop structure (not shown) on one side of the wrapped package 209 (e.g., the top of the wrapped package 209). In one aspect, the fastening mechanism 206 may include a rod having a hook (not shown) on the end of the rod. The rod can be configured to couple to the loop structure of the wrapped package 209. Alternatively or additionally, the UAV 207 may have a U-shaped loop structure (not shown) on the bottom side of the UAV 207. Further, a rod may be pre-attached to the package 209 and the hook may grab onto the metal U-shaped loop on the UAV 207.

In another aspect, the UAV 207 may include a fastening mechanism 206 that includes a forklift system that allows the UAV 207 to support or hold a package 209 or other payload. In one embodiment, the fastening mechanism 206 comprising the forklift system may include prongs or tines (not shown), which may be placed under package 209 or payload to hold the package 209. For example, the prongs or tines may extend in a direction in relation to the UAV 207 that is generally horizontal during flight. For example, a UAV 207 may tilt and turn during flight, but may generally have a default horizontal position, such as the position of the UAV 207 when it lands on the ground or when the UAV 207 hovers. The tines or prongs may be substantially horizontal in that they are substantially or approximately parallel to a fuselage or frame of the UAV 207 when the UAV 207 is in a hovering or resting position.

The forklift system also may include an extension mechanism configured to selectively retract and extend tines or prongs. The extension mechanism may include a mast, rod, telescopic cylinders and/or any length-adjustable mechanism for adjusting a distance of the elongated members (or fork) from a body of the UAV 207. For example, the extension mechanism may extend below the UAV 207 and support the elongated members at some distance from an underside of a fuselage of the UAV 207, or any other opposing surface. The distance between the elongated members and the opposing surface may determine what height of package or payload can be held by the forklift system and/or the UAV 207.

In one aspect, the UAV 207 may include sensors (not shown) for sensing or identifying objects or surfaces in an environment near the UAV 207. In one embodiment, the sensors may be used to obtain or detect identifying information on a package 209 or payload. For example, the sensors may include an optical sensor or tag reader configured to read identifying information from the tag or barcode. Example sensors may include a camera, RFID tag reader, laser barcode scanner, or the like.

In one aspect, the UAV 207 may include an identification component (not shown) that is configured to identify one or more potential packages. For example, the sensors may scan/image each package or payload they encounter and the identification component may identify each scanned/imaged package or payload based on the sensor data. In one embodiment, the identification component may identify a package or payload by determining a serial number or other identifier corresponding to the package or payload. For example, a tag or barcode may be read to determine the identity of a payload. In one embodiment, the UAV may receive instruction to deliver a specific package and the identification component may identify packages until a match for the specific package is found.

Based on the identity, or identifying information, the identification component may determine one or more characteristics for the package or payload. In one embodiment, the identification component may determine a serial number or unique identifier for a package and then query, via a radio, a database for characteristics or requirements for the package. The identification component may determine one or more dimensions of a package. The dimensions may be needed to allow the forklift system to accommodate and/or hold the package. The identification component may identify a delivery location based on an identity of the payload. The delivery location may include an address, GPS location, or the like. The delivery location may include enough information to allow the UAV 207 to fly to and deliver the package.

In one aspect, the UAV 207 may include a size component configured to determine a dimension of the payload. For example, the size component may determine a vertical height, horizontal height, or depth of the package. The size component may determine the dimension based on data gathered by the identification component or may determine the size based on a camera image or other data. The size component may also determine a weight or other information about the package relative to delivery.

In one aspect, the UAV 207 may include a length component configured to control an extension mechanism of the forklift system of the fastening mechanism 206 to adjust a distance between the opposing surface and the one or more elongated members. For example, the length component may actuate a mast (not shown) of the forklift system so that there is sufficient vertical height between the forks (elongated members) and an underside of a fuselage to accommodate the payload. As another example, the length component may retract the mast completely when there is no payload (e.g., upon unloading a payload and returning to a warehouse, vehicle, or package location). The length component may also actuate the mast to maintain a gripping force on a payload, when applicable. In one embodiment, the length component may adjust the height during flight or may land to perform height adjustments for the forklift system.

In one aspect, the UAV 207 may include a load component (not shown) configured to control the UAV 207 to load a payload. In one embodiment, the load component causes the UAV 207 to fly or move the UAV 207 to position the payload between the one or more elongated mechanisms and the opposing surface. For example, the load component may cause a flight system of the UAV 207 to fly the UAV 207 to position the forks or elongated members of the forklift system underneath a target package and an opposing surface (such as an underside of a fuselage) above the target package. For example, the elongated members may be positioned under or in a cardboard crate underneath the package or payload. Once the UAV 207 is positioned, the length component may retract the mast of the forklift system to secure and/or grip the payload between the one or more elongated mechanisms and an opposing surface. When the payload is secured, the UAV 207 may be ready for attachment to the ground component (e.g., ground component 102) for payload delivery.

In one aspect, the UAV 207 may include an unload component (not shown) which may be configured to control the UAV 207 to release or unload a payload once delivered to a given destination. For example, after flying to a delivery destination the unload component may cause the UAV 207 to perform an unload procedure. In one embodiment, the unload component may cause the forklift system to increase a distance between the at least one elongated member and the opposing surface to release the payload. In one embodiment, the unload component may additionally cause the UAV 207 to tilt the UAV 207 in a first direction and fly or move the UAV 207 in a second direction substantially opposite the first direction to cause the payload to slide off of the at least one elongated member. In another aspect, a vertical take-off UAVs 207 with rotors may move in a direction of tilt rather than in a direction opposite tilt. However, when unloading there are often different forces involved than in generalized flying situations. For example, the movement of the package due to release of the forklift mechanism, contact of the package with the ground, delivery box, or the like may produce forces that allow the UAV 207 to tilt in one direction and fly in the opposite direction. In one embodiment, the unload component may set the package and/or a cardboard crate on the ground or other surface for delivery and then fly sideways to unload the payload.

The UAV may optionally include mission instruments such as a camera, microphones, equipment fastener hooks, at least one screen, sounding balloons, or small pieces of equipment specific to a destination. According to another aspect, the UAV may be fitted with measuring equipment, e.g., in order to take samples of the atmosphere so as to detect signs of pollution.

In one embodiment, the UAV may scan one or more packages using a sensor that can read a quick response (QR) code, bar code, text, or the like to identify a package. For example, the UAV may include a camera or other optical sensor. In one embodiment, the UAV may scan the one or more packages using another type of reader such as a radio-frequency identification (RFID) tag reader to read RFID tags.

In various aspects, based on the identity of the package, box, or payload, the UAV may determine metadata about the package. For example, the information read from the tag or code may include the metadata or may include a key to look up the metadata in a database or table. The metadata for the package, box, or payload may include a height of the package, a delivery destination (e.g., GPS or address information), or the like.

As noted, embodiments of devices and systems (and their various components) described herein can employ (AI) to facilitate automating one or more features described herein (e.g., performing object recognition, determining optimal routes, picking up and delivering packages, and the like). The components can employ various AI-based schemes for carrying out various embodiments/examples disclosed herein. To provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determinations.

A classifier can map an input attribute vector, z=(z1, z2, z3, z4, ..., zn), to a confidence that the input belongs to a class, as by f(z)=confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 3:
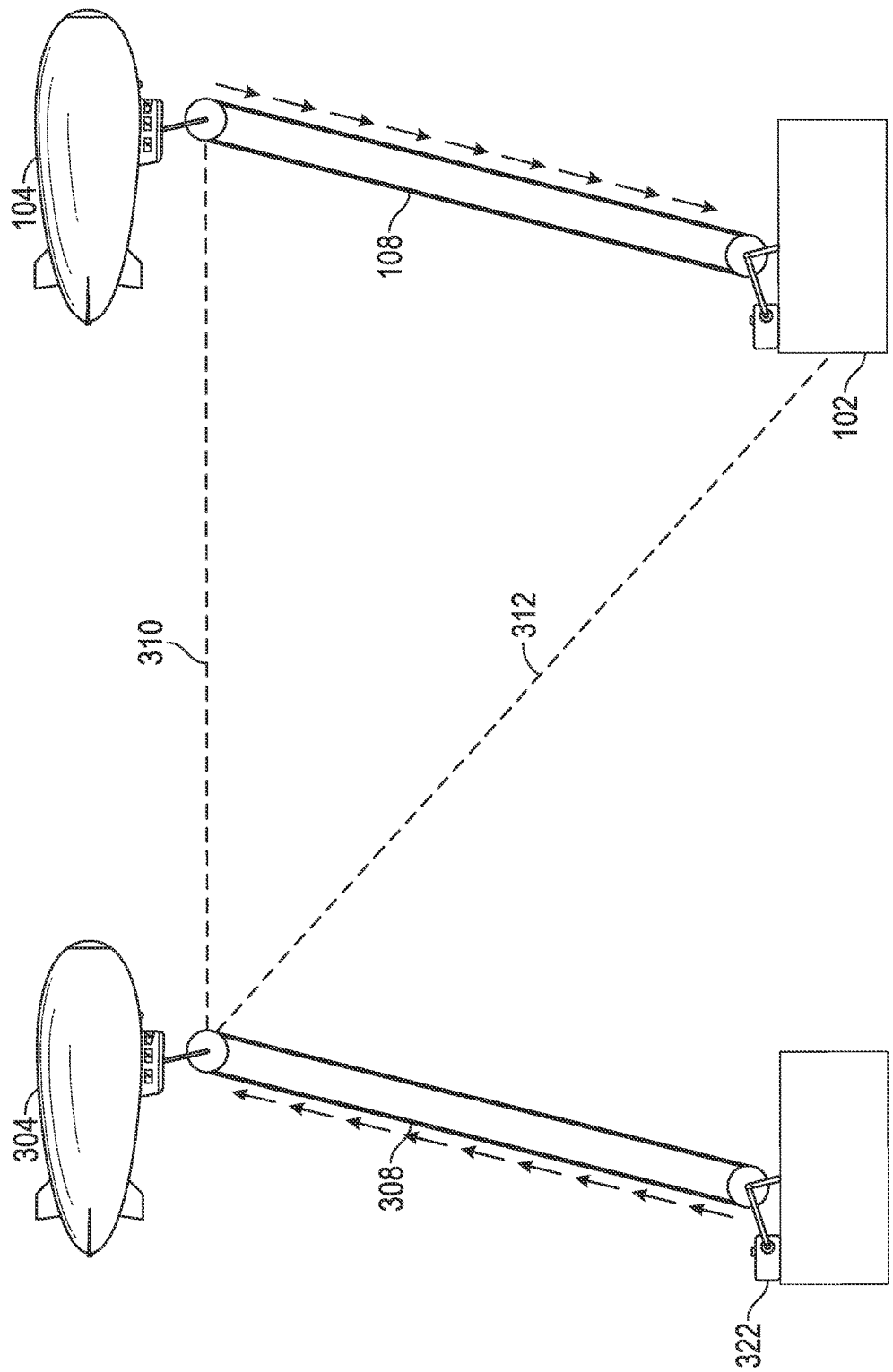
FIG. 3 illustrates a diagram of a set of components for a package delivery system using UAVs with additional aerial components, according to various embodiments of the disclosure.

FIG. 3 illustrates a diagram of a set of components for a package delivery system using UAVs with additional aerial components, according to various embodiments of the disclosure. In one aspect, diagram 300 shows ground component 102. As noted, the ground component 102 can include a stationary component such as a ground-based distribution center, or a mobile component such as a vehicle. For further description, please refer to the discussion of FIG. 1, above. In another aspect, diagram 300 shows aerial component 104. As noted, the aerial component 104 may include a balloon, a blimp, or a thermal airship, or the like. For further description, please refer to the discussion of FIG. 1, above. In one aspect, diagram 300 shows winch 105. For further description, please refer to the discussion of FIG. 1, above.

In another aspect, diagram 300 shows a path 310 between the aerial component 104 and a second aerial component 304. For further description, please refer to the discussion of FIG. 1, above. In one aspect, diagram 300 shows second aerial component 304. For further description, please refer to the discussion of the aerial component 104 as shown and described in connection with, above. In another aspect, diagram 300 shows second winch 308. For further description, please refer to the discussion of winch 105 as shown and described in connection with FIG. 1, above. In one aspect, diagram 300 shows second ground component 322. For further description, please refer to the discussion of ground component 102 as shown and described in connection with, above.

In another aspect, diagram 300 indicates that there may be aerial components (e.g., aerial component 104 and 304) connected to two or more ground components (e.g., ground components 102 and 322 which may represent, for example, two or more ground distribution centers). In another aspect, an aerial component 104 may be associated with package delivery, and the second aerial component 322 may be associated with package reception. In one aspect, a package at the ground component 102 (e.g., a first distribution center) may be elevated up toward a first aerial component 104 (e.g., a first balloon A) using a first winch line and a winch system 105; then, a UAV (not shown) may transport the package to a second winch line associated with the second winch system 308, which may be attached to a second aerial component 324 (e.g., a second balloon B). In another aspect, the package may be lowered via the second winch line to a second ground component 322 (e.g., a second distribution center). In this way, UAVs may remain at a higher altitude during transport (e.g., compare the altitude of path 310 with the changing altitude of path 312), which has less air drag because of the lower air density at higher elevation. Further, such embodiments may enable a more energy efficient systems, methods, and apparatuses to raise packages and drones up to the predetermined altitude, thereby providing energy savings.

In some aspects, as noted, the mobile ground components (e.g., ground components 102 and 322, and the like) may be arranged strategically to cover a given geographical area for a given period of time. For example, during periods of high demand for packages (e.g., during holiday seasons, during disaster relief operations, etc.), several mobile ground components may be arranged in a given pattern in a city or county to most efficiently distribute the packages to different sites for a period of time, such as for a day, a week, or longer.

Figure 4:
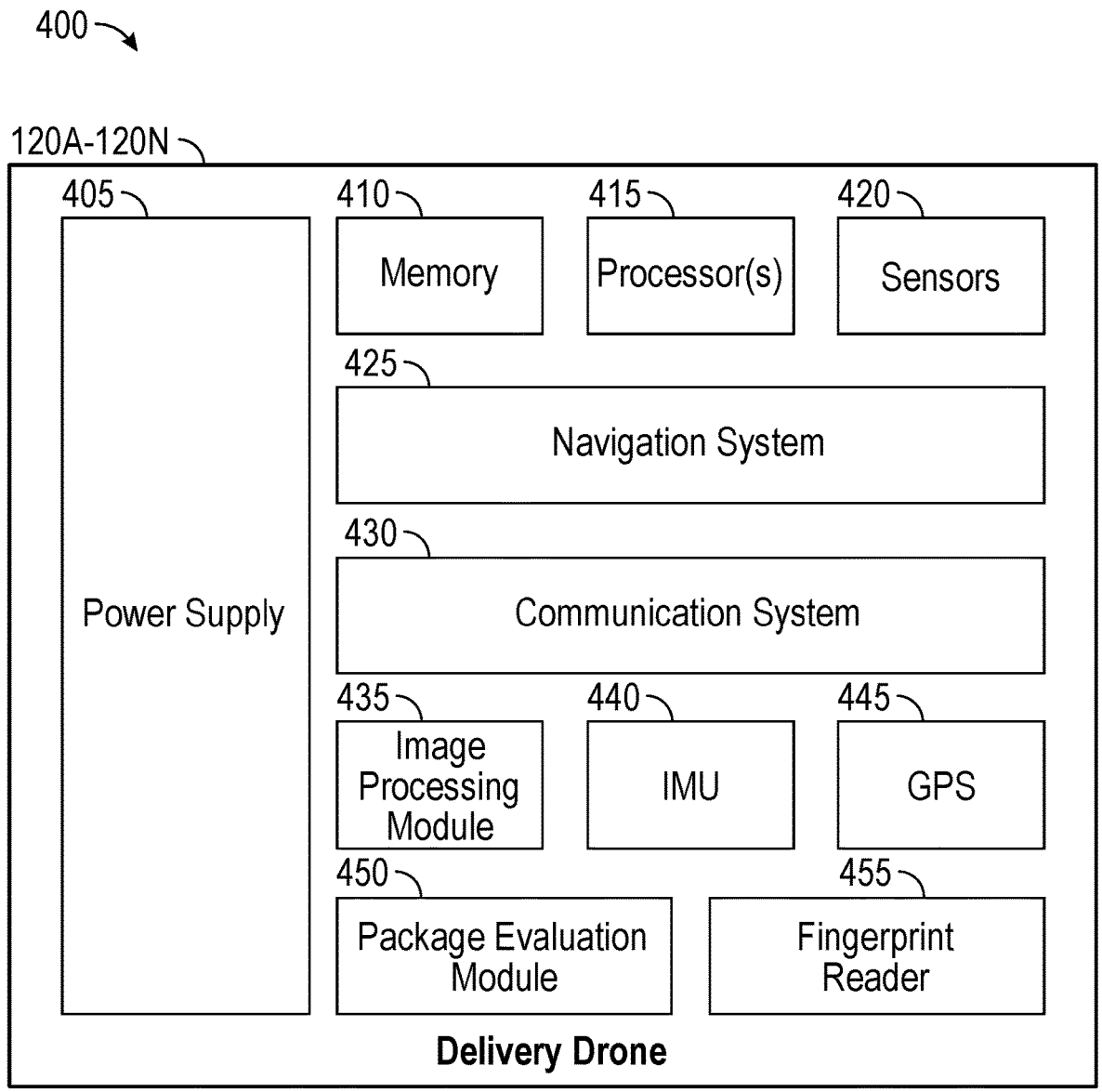
FIG. 4 illustrates a set of components within a UAV, according to various embodiments of the disclosure.

FIG. 4 represents a diagram showing a set of components associated with a UAV, according to various embodiments of the disclosure. In particular, the UAV or drone may include a power supply 405 (e.g., battery), a memory 410 (e.g., volatile memory and/or nonvolatile memory), processor(s) 415 for executing instructions and performing calculations, sensors 420, navigation system 425, communication system 430, image processing module 435, inertial measurement unit (IMU) 440, global positioning system (GPS) 445, package evaluation module 450, and fingerprint reader 455.

In one embodiment, the communication system 430 may also include one or more communications interfaces for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the communication system 430 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Zigbee, Bluetooth protocols, wireless universal serial bus (USB) protocols, and/or any other wireless protocol.

Processor(s) 415 are the main processors of drone which may include application processors, various coprocessors, and other dedicated processors for operating drone. Processor(s) 415 may be communicably coupled with memory 410 and configured to run the operating system, user interfaces, sensors 420, navigation system 425, communication system 430, image processing module 435, and/or other components. In some embodiments, processor(s) 415 may include multiple dedicated or shared processors configured to perform signal processing (e.g. baseband processors for cellular communications), implement/manage real-time radio transmission operations, of the drone, make navigation decisions (e.g., compute flight paths, implement obstacle avoidance routines, etc.). These processors along with the other components may be powered by power supply 405. The volatile and nonvolatile memories found in various embodiments may include storage media for storing information such as processor-readable instructions, data structures, program modules, or other data. Some examples of information that may be stored include basic input/output systems (BIOS), operating systems, and applications.

Sensors 420 may be used to detect events or changes in the surrounding environment and produce a corresponding signal that can be acted upon by various components within the delivery drone or transmitted to other parts of the drone delivery infrastructure. In some embodiments, sensors 420 may include one or more of the following: a microphone, a camera, a thermostat, an accelerometer, light sensors, motion sensors, moisture sensors, fingerprint readers, retinal scanners, chemical sensors, scales, LIDAR, RADAR, and the like. Several of these sensors, for example, may be used as part of navigation system 425. Other sensors may be used to evaluate the package or record the environment. As another example, battery life can vary significantly based on temperature. As such, the temperature reading from the thermostat may be used to more accurately predict the range of the delivery drone. In some embodiments, the signal generated by the microphone can be used to determine the noise level of the surrounding environment and to record a voice message or identification from a user inserting or removing a package. Still yet, sensors 420 may include credit card readers for accepting payments, including Bluetooth or near field communication (NFC) systems.

Navigation system 425 can be responsible for determining the flight path of delivery drone. In some embodiments, high-level instructions or pick-up/drop-off destinations can be communicated to the drone via communication system 430. Navigation system 425 may receive inputs from multiple sensors 420 (e.g., accelerometers, gyroscopes, LIDAR, RADAR, etc.), image processing module 435, inertial measurement unit (IMU) 440, and/or GPS 445 to determine optimal flight paths, detect and avoid objects, coordinate with other nearby drones using communication system 430, and the like. For example, IMU 440 can determine the delivery drone's orientation and velocity.

According to one embodiment, the navigation system 425 may include location determining aspects, devices, modules, functionalities, and/or similar words used herein interchangeably. For example, the navigation system 425 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the drone's position in connection with a variety of other systems, including cellular towers, Wi-Fi access points, and/or the like. Similarly, the navigation system 425 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (for example smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

FIG. 4 illustrates a set of components within a delivery UAV, according to various embodiments of the disclosure. In another aspect, the drone may include a package evaluation module 450 that can use input from sensors 420, image processing module 435, and/or fingerprint reader 455 to determine whether to accept the package from the user. For example, package evaluation module 450 may request user authentication via fingerprint reader 455 and/or another biometric reader. If the reading does not match the record on file (e.g., from an initial registration with the delivery system), then the package evaluation module 450 may determine to not accept the package. As another example, a scale may be used to measure the weight of the package. If package evaluation module 450 determines that the package exceeds a maximum weight for the delivery drone, then the package may be denied.

Package evaluation module 450 may use multiple different types of sensors 420 to make a determination. For example, package evaluation module 450 may use the image processing module 435 to identify the size and/or type of package, various types of chemical sensors to detect possible explosives, barcode readers to identify an originator/packer, as well as others. In some embodiments, the package analysis governed by package evaluation module 450 could be a combination of: X-Ray of packages and/or chemical sensors to ensure hazardous packages are not sent. In some embodiments, the delivery drones may also include a display (e.g., a liquid crystal display) or interface with a mobile device (e.g., via a personal area network, Bluetooth, cellular network, etc.) to confirm with the user that no hazardous packages (e.g., listed on the display) are included in the shipment. If no confirmation is received, the package evaluation module 450 may refuse the delivery.

Figure 5:
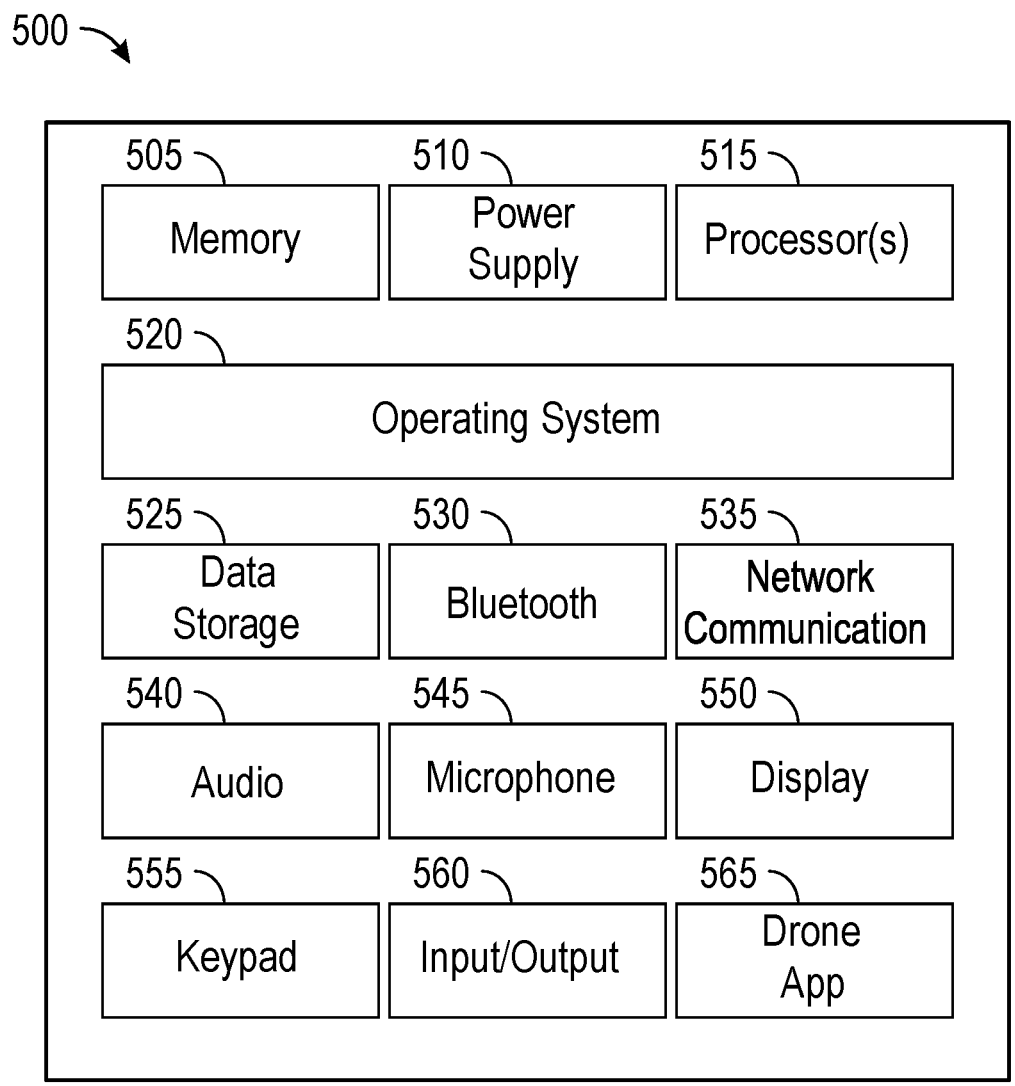
FIG. 5 illustrates a set of components within a mobile device with a UAV management application, according to various embodiments of the disclosure.

FIG. 5 illustrates a set of components within a mobile device with a drone management application according to various embodiments of the disclosure. The drone management application may be used to configure aspects of the UAVs in association with the aerial components, winches, and/or ground components described above. As shown in FIG. 5, mobile device 500 may include memory 505 (e.g., volatile memory and/or nonvolatile memory), power supply 510 (e.g., battery), processor(s) 515 for executing processing instructions, and operating system 520. Additional components such as data storage component 525 (e.g., hard drive, flash memory, memory card, etc.), one or more network interfaces (e.g., Bluetooth Interface 530; and network communication interface 535, which enables the mobile phone to communicate by transmitting and receiving wireless signals using licensed, semi-licensed or unlicensed spectra over a telecommunications network), audio interface 540, microphone 545, display 550, keypad or keyboard 555, and other input and/or output interfaces 560 (e.g. a fingerprint reader or other biometric sensor/security feature). The various components of a mobile device may be interconnected via a bus.

Processor(s) 515 are the main processors of mobile device 500, and they may include application processors, baseband processors, various coprocessors, and other dedicated processors for operating mobile device 500. For example, an application processor can provide the processing power to support software applications, memory management, graphics processing, and multimedia. An application processor may be communicably coupled with memory 505 and configured to run the operating system, the user interface, and the applications stored on memory 505 or data storage component 525. A baseband processor may be configured to perform signal processing and implement/manage real-time radio transmission operations of mobile device 500. These processors along with the other components may be powered by power supply 510. The volatile and nonvolatile memories found in various embodiments may include storage media for storing information such as processor-readable instructions, data structures, program modules, or other data. Some examples of information that may be stored include basic input/output systems (BIOS), operating systems, and applications.

In accordance with some embodiments, drone application 565 may be installed on mobile device 500. Drone application 565 may be used to register a user, confirm pick-up/drop-off locations and/or times, convey the current location of a delivery drone, provide real-time video or images from a delivery done, reschedule pick-up/drop-off times/locations, and the like.

Figure 6:
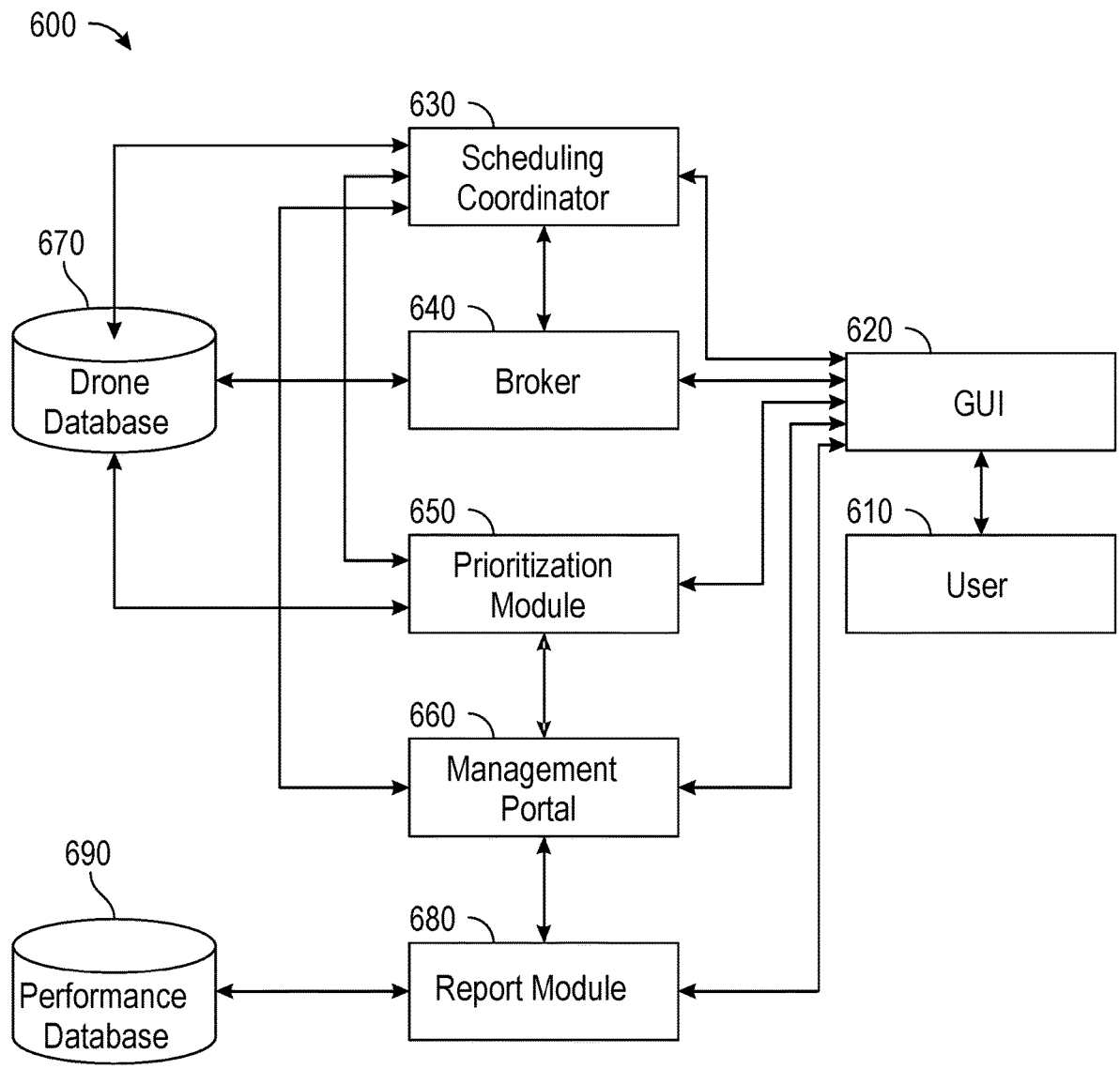
FIG. 6 illustrates a set of components of a UAV management engine used for scheduling and monitoring delivery drones, according to various embodiments of the disclosure.

FIG. 6 illustrates a set of components 600 of a drone management engine used for scheduling and monitoring delivery drones according to various embodiments of the present technology. As illustrated in FIG. 6, drone management engine may allow user 610 to interface with GUI 620 to request a drone pick-up. GUI 620 (e.g., generated via drone/mobile application 565) can then transmit the request to scheduling coordinator 630. Scheduling coordinator 630 is responsible for efficiently scheduling the delivery drone. Scheduling coordinator 630 may base selection of the delivery drone from the fleet based on current drone locations, package information, user preferences, battery power, weather conditions, and/or other preference or constraint.

In some cases, scheduling coordinator 630 may need to request the services of broker 640 or prioritization module 650 to determine which drones should be allocated to which request. For example, in some embodiments, the drones may be owned and operated by multiple different operators. As such, broker 640 can take bids for the current job request. The bids can be received through various automated auctions (e.g., reverse auction, Dutch auction, blind auction, etc.) In other cases, preferred providers may be offered a right of first refusal on a fixed price. Still yet, in some embodiments, scheduling coordinator 630 may provide a small set of drones determined to be a good fit for the delivery request. Once these are received, broker 640 can determine which drone to use based on bidding, next in queue, and the like. Using these and other techniques, broker 640 can identify to scheduling coordinator 630 a delivery drone that can complete the delivery. Once selected, scheduling coordinator 630 can use various communications (e.g., wireless networks) to convey the instructions to the selected delivery drone.

When multiple requests are received, scheduling coordinator 630 may use prioritization module 650 to determine a priority for completing the requests. Prioritization module 650 can use factors such as, but not limited to, user priorities, current wait times, drone locations, and the like. In some cases, one or more governmental agencies or regulators can issue requests for one or more drones to deviate from their delivery schedule. For example, when a drone is schedule to cross country borders, a request for deviation to comply with customs inspections may be processed using management portal 660.

As another example, firefighter or police agencies may set up temporary or permanent no-fly zones. Still yet, police may request that a delivery drone land for execution of a search warrant or other reasons. In some embodiments, the drone delivery system may use features of the communications network to prioritize or enhance communications. For example, the drone delivery system may use the E911 system in a cellular network to effectively deliver needed supplies to first responders with the delivery drones. Examples of supplies may include drugs (e.g. anti-venom), neutralizing agent (e.g., to Haz-Mat team), water, clothes, tools, and the like. All of these requests are handed through management portal 660.

Drone database 670 logs the current status of each drone. In addition, some drones provide streaming video or images of selected (e.g., pick-up and drop-off) parts of their flight. These media may be stored in drone database 670. In addition, drone management engine 140 may include report module 680 for generating reports based on performance data logged in performance database 690.

Figure 7:
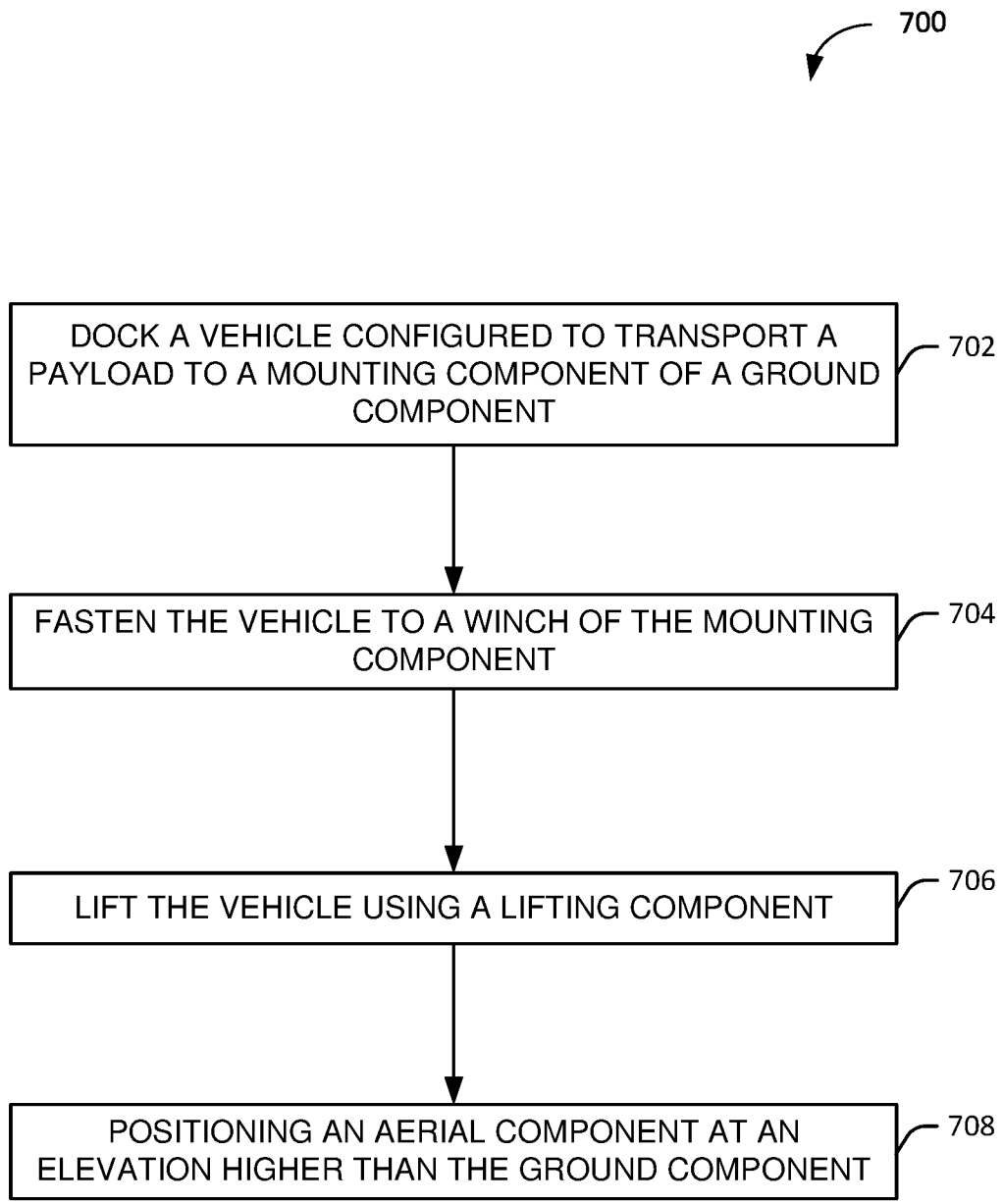
FIG. 7 shows a diagram of a process flow for package delivery using UAVs, in accordance with example embodiments of the disclosure.

FIG. 7 shows a diagram 700 of an example process flow for using UAVs for package delivery, in accordance with example embodiments of the disclosure. At block 702, a vehicle (e.g., a UAV) configured to transport a payload may be docked to a mounting component of a ground component. In another aspect, the ground component can include a ground-based distribution center. In another aspect, the distribution center may include three main areas and additional specialized areas. In one aspect, the three main areas may include a receiving area or dock, a storage area, and a shipping area or dock. In smaller ground components, it may be possible for the receiving and shipping functions to occur side by side. In another aspect, the receiving dock can also be specialized based on the handling characteristics of freight being received, on whether the product is going into storage or directly to a store, or by a type of vehicle delivering the product.

In another aspect, the ground component may include a mobile component (e.g., a vehicle such as a truck). In particular, the type of vehicle may include a specialized vehicle to deliver a particular type of product. For example, the mobile ground component may include semi-trailers that are outfitted with various trailers such as box trailers, flatbeds, car carriers, tanks and other specialized trailers. Further, the mobile component may have a dedicated mounting component.

At block 704, the vehicle may be fastened to a winch of the mounting component. In one aspect, the winch may include a mechanical device that may be used to pull in (wind up) or let out (wind out) or otherwise adjust the tension of a rope or cable. The winch may include of a spool and attached hand crank or motor. In one aspect, the UAV can couple (e.g., mechanically attach) to package, and the assembly can then couple to the winch (e.g., mechanically attach using a drone component such as an arm and hand to grab a cable of the winch system).

At block 706, a lifting component may be used to lift the vehicle vertically to a first elevation using a motor and a cable. In another aspect, the winch system may have gear assemblies and can be powered by motors that may include electric, hydraulic, pneumatic or internal combustion drives. In one aspect, the motor may rotate the winch to elevate the package and the UAV to a given elevation. In one aspect, the elevation of the package and the UAV may be less than the elevation of the aerial component; further, the elevation may be determined at least in part on the range needed for the UAV to deliver the package. Further, the elevation may be determined a power capacity of the UAV, a weight of the package, a weather condition, an air density, and the like. Additionally, the elevation may be determined by a second, additional elevation determined for any additional efficiency desired by the drone operator. For example, the additional elevation may serve to enable the UAV to glide more if release from the winch line at a higher elevation. In one aspect, the motor of the winch system may operate continuously, and the UAV may simultaneously determine the UAV's elevation using one or more UAV sensors (e.g., altitude sensors, GPS signals, and the like). In another aspect, when the UAV determines that the UAV has reached a pre-determined elevation, a component of the UAV (e.g., the UAV's arm and hand) may release from a cable associated with the winch system and then transport the package to its destination.

At block 708, a first aerial component may be positioned at a second elevation and the first aerial component may be connected to the ground component by the cable. Moreover, the elevation may be determined by a second, additional elevation determined for any additional efficiency desired by the drone operator. For example, the additional elevation may serve to enable the UAV to glide more if release from the winch line at a higher elevation. In one aspect, the motor of the winch system may operate continuously, and the UAV may simultaneously determine the UAV's elevation using one or more UAV sensors (e.g., altitude sensors, GPS signals, and the like). In another aspect, when the UAV determines that the UAV has reached a pre-determined elevation, a component of the UAV (e.g., the UAV's arm and hand) may release from a cable associated with the winch system and then transport the package to its destination. Further, as noted, in some aspects, embodiments of the disclosure may include an aerial component. In one aspect, the aerial component may include a passive aerial element (e.g., a balloon such as a weather balloon), or an active aerial element (e.g., a blimp having a motor to maintain a relatively fixed position for a given duration of time, for example, by resisting wind currents).

One or more operations of the methods, process flows, and use cases of FIGS. 1-7 may be performed by one or more engines, program module(s), applications, or the like executable on electronic device. It should be appreciated, however, that such operations may be implemented in connection with numerous other device configurations.

The operations described and depicted in the illustrative methods and process flows of FIGS. 1-7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Example embodiments of the disclosure may include one or more of the following examples:

Example 1 may include a system, comprising: a first component at a first elevation, wherein the first component is operatively connected to a winch; a second component at a second elevation higher than the first elevation; and a lifting component comprising a cable, the cable: operatively connected to the first component and the second component, configured to connect to and disconnect from a vehicle, and configured to lift the vehicle from the first component towards the second component using the winch.

Example 2 may include the system of example 1, wherein the vehicle includes an unmanned aerial vehicle.

Example 3 may include the system of example 1 and/or some other examples herein, wherein the cable is a first cable, and wherein the system further comprises a lowering component comprising a second cable, the lowering component configured to lower the vehicle toward the first elevation using the winch.

Example 4 may include the system of example 1 and/or some other examples herein, wherein the lifting component includes a motor, the motor including at least one of an electric motor, a hydraulic, a pneumatic motor, or an internal combustion motor.

Example 5 may include the system of example 1 and/or some other examples herein, wherein the second component includes a balloon, a blimp, or a thermal airship.

Example 6 may include the system of example 1 and/or some other examples herein, wherein the second component is passive against air currents or actively resists air currents.

Example 7 may include the system of example 1 and/or some other examples herein, wherein the first component includes a stationary component or a mobile component.

Example 8 may include the system of example 7 and/or some other examples herein, wherein the stationary component includes a distribution center and the mobile component includes a second vehicle.

Example 9 may include the system of example 1 and/or some other examples herein, wherein the cable configured to lift the vehicle between the first component and the second component using the winch further comprises the cable configured to lift the vehicle to a third elevation that is lower than the second elevation.

Example 10 may include the system of example 9 and/or some other examples herein, wherein the third elevation is based on a travel distance for transporting the payload by the vehicle.

Example 11 may include the system of example 1 and/or some other examples herein, wherein the first component may include a charging unit for charging the vehicle.

Example 12 may include a system, comprising: a first component at a first elevation, wherein the first component is operatively connected to a winch; a second component at a second elevation higher than the first elevation: a lifting component comprising a cable, the cable: operatively connected to the first component and the second component, configured to connect to and disconnect from a vehicle, and configured to lift the vehicle from the first component towards the second component using the winch; and a third component at a third elevation, the third component configured to receive the vehicle from the second component.

Example 13 may include the system of example 12 and/or some other examples herein, wherein the vehicle is a first component, and wherein the second component is further configured to receive a second vehicle from the third component.

Example 14 may include the system of example 12 and/or some other examples herein, wherein the vehicle includes an unmanned aerial vehicle.

Example 15 may include the system of example 12 and/or some other examples herein, wherein the cable is a first cable, and wherein the second component further comprises a lowering component comprising a second cable, the lowering component configured to vertically lower the vehicle to a ground level using the winch.

Example 16 may include the system of example 12 and/or some other examples herein, wherein the second component is passive against air currents or actively resists air currents.

Example 17 may include the system of example 12 and/or some other examples herein, wherein the first component includes a stationary component or a mobile component.

Example 18 may include the system of example 12 and/or some other examples herein, wherein the first component includes one of a stationary component that includes a distribution center or a mobile component that includes a second vehicle.

Example 19 may include a method, comprising: positioning a first component at a first elevation, and operatively connecting the first component to a winch; positioning a second component at a second elevation higher than the first elevation; and configuring cable of a lifting component to: operatively connect to the first component and the second component, connect to and disconnect from a vehicle, and lift the vehicle from the first component towards the second component using the winch.

Example 20 may include the method of example 19 and/or some other examples herein, wherein the vehicle includes an unmanned aerial vehicle.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. A system, comprising:
    a first component at a first elevation, wherein the first component is operatively connected to a winch;
    a second component at a second elevation higher than the first elevation; and
    a lifting component comprising a cable, the cable:
        spanning between and operatively connected to the first component and the second component,
        configured to operatively connect to and operatively disconnect from a vehicle,
        a first portion of the cable configured to move in a first direction between the first component and the second component based on operation of the winch, and
        a second portion of the cable configured to move, based on the operation of the winch and concurrent with the first portion moving in the first direction, in a second direction between the first component and the second component, and
        configured to lift the vehicle from the first component towards the second component in the first direction based on the operation of the winch.

2. The system of claim 1, wherein the vehicle includes an unmanned aerial vehicle.

3. The system of claim 1, wherein the second portion of the cable is a a lowering component configured to lower the vehicle toward the first elevation based on the operation of the winch.

4. The system of claim 1, wherein the lifting component includes a motor associated with controlling the operation of the winch, the motor including at least one of an electric motor, a hydraulic, a pneumatic motor, or an internal combustion motor.

5. The system of claim 1, wherein the second component includes a balloon, a blimp, or a thermal airship.

6. The system of claim 1, wherein the second component is passive against air currents or actively resists air currents.

7. The system of claim 1, wherein the first component includes a charging unit for charging the vehicle.

8. The system of claim 1, wherein the first component includes a stationary component or a mobile component.

9. The system of claim 8, wherein the stationary component includes a distribution center and the mobile component includes a second vehicle.

10. The system of claim 1, wherein the cable configured to lift the vehicle between the first component and the second component using the winch further comprises the cable configured to lift the vehicle to a third elevation that is lower than the second elevation.

11. The system of claim 10, wherein the third elevation is based on a travel distance for transporting a payload associated with the vehicle.

12. A system, comprising:
    a first component at a first elevation, wherein the first component is operatively connected to a winch;
    a second component at a second elevation higher than the first elevation:
    a lifting component comprising a cable, the cable:
        spanning between and operatively connected to the first component and the second component,
        configured to operatively connect to and operatively disconnect from a vehicle,
        a first portion of the cable configured to move in a first direction between the first component and the second component based on operation of the winch, and
        a second portion of the cable configured to move, based on the operation of the winch and concurrent with the first portion moving in the first direction, in a second direction between the first component and the second component, and
        configured to lift the vehicle from the first component towards the second component in the first direction based on the operation of the winch; and
    a third component at a third elevation, the third component configured to receive the vehicle from the second component and transport the vehicle to a fourth component.

13. The system of claim 12, wherein the vehicle includes an unmanned aerial vehicle.

14. The system of claim 12, wherein the second portion of the cable is a lowering component configured to vertically lower the vehicle to the first elevation based on the operation of the winch.

15. The system of claim 12 wherein the second component is passive against air currents or actively resists air currents.

16. The system of claim 12, wherein the first component includes a stationary component or a mobile component.

17. The system of claim 12, wherein the first component includes one of a stationary component that includes a distribution center or a mobile component that includes a second vehicle.

18. A method, comprising:
    positioning a first component at a first elevation, and operatively connecting the first component to a winch;
    positioning a second component at a second elevation higher than the first elevation; and
    configuring a cable of a lifting component to:
        span between and operatively connect to the first component and the second component,
        operatively connect to and operatively disconnect from a vehicle,
            a first portion of the cable configured to move in a first direction between the first component and the second component based on operation of the winch,
            and a second portion of the cable configured to move, based on the operation of the winch and concurrent with the first portion moving in the first direction, in a second direction between the first component and the second component, and
        lift the vehicle from the first component towards the second component in the first direction based on the operation of the winch.

19. The method of claim 18, wherein the vehicle includes an unmanned aerial vehicle.

20. The method of claim 18, further comprising lowering the vehicle toward the first component in the second direction based on the operation of the winch.

\* \* \* \* \*